Dec. 22, 1970    P. BELOKIN, JR    3,548,528
DISPLAY AND DISPLAY MOUNTING
Filed July 16, 1968

INVENTOR
PAUL BELOKIN, JR.
By Harbaugh & Thomas
Attorneys

United States Patent Office 3,548,528
Patented Dec. 22, 1970

3,548,528
DISPLAY AND DISPLAY MOUNTING
Paul Belokin, Jr., 6919 W. 23rd St.,
Berwyn, Ill. 60402
Filed July 16, 1968, Ser. No. 745,224
Int. Cl. G09f 1/12
U.S. Cl. 40—160    7 Claims

ABSTRACT OF THE DISCLOSURE

A flat mounting or plaque for molded plastic figures having a contoured aperture and tabs defined between flared cuts, the aperture being shaped to encompass the flanged edge of the plastic figure, with the tabs overlapping under and against the inside wall of the figure. The device is characterized by raised or three-dimensional effect imparted to the figure, its simplicity, ease of manufacture and good appearance.

BACKGROUND OF THE INVENTION

The manufacture of ornamental displays suitable for use in the home or in commercial advertising from molded plastics is known. The art of plastics molding and coloring has advanced so that life-like three-dimensional figures can be formed with facility. It is highly desirable that these figures be suitable for mounting on a plaque for display purposes in a manner where the item has a life-like appearance. Often the manner of mounting the figure to the plaque is unsightly or detracts from the three-dimensional appearance of the molded item by requiring that it be inset into the plaque or hang from a chain or hook. The cost of manufacture and assembly rises where complicated arrangements are used to gain a life-like appearance. Also the true shape and contour of the figure is distorted in order to mold therein suitable means to fasten the figure to the plaque.

The present invention has as its objective the provision of a flat mounting or plaque which is of simple design and good appearance that is easily and positively locked to a molded plastic figure to form a display having life-like appearance, and overcomes the disadvantages of the prior art.

SUMMARY OF THE INVENTION

The invention concerns a thin planar display plaque having an opening conforming to the outer configuration of the flanged back side of a molded figure, with a pair of opposed shallow tabs, formed therein by angle cuts through the plaque, whereby the flanged edge of the molded figure is inserted under the periphery of the opening and the tabs are bent inside and under the wall of the figure to form a unified structure and display mount.

DESCRIPTION OF THE DRAWINGS

An illustrated embodiment of this invention is shown in the drawings wherein.

THE PREFERRED EMBODIMENT

Figure 1:
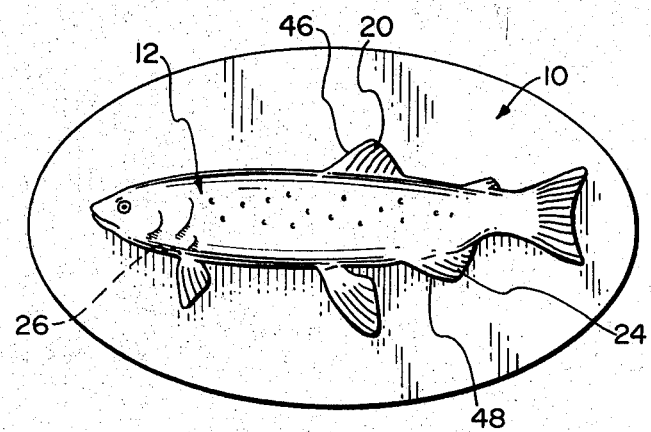
FIG. 1 is a top plan view of an assembled plaque with the plastic figure of a trout affixed thereto.
Figure 2:
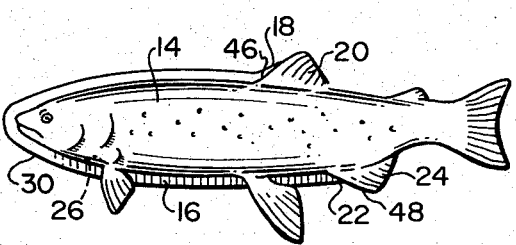
FIG. 2 is a top plan view of the molded figure of the fish only.
Figure 3:
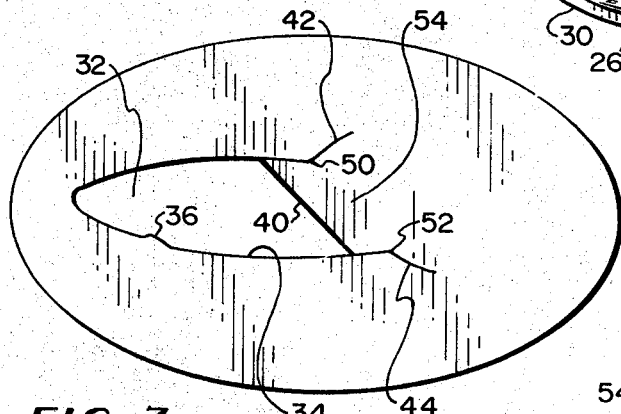
FIG. 3 is a top or front plan view of the mounting board with the fish removed.
Figure 4:
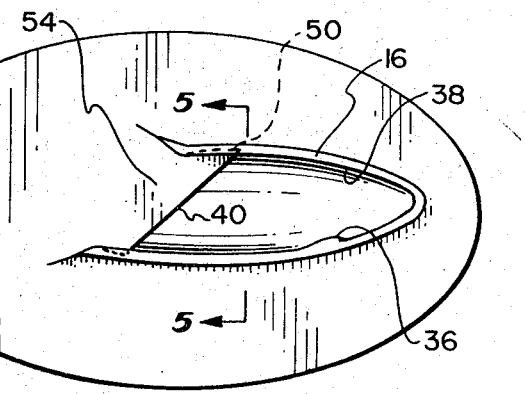
FIG. 4 is a back plan view of the assembly shown in FIG. 1.

Referring to the drawings, the plaque 10 is shown with the molded figure of a fish 12 thereon. The figure 12 has a rounded and contoured side wall 14 with a flange 16 extending around a portion of the periphery of the back side and the edge 18 tapering into the back edge of the fin 20. Similarly, the edge 22 of the flange 16 tapers into the back edge of the lower fin 24.

The figure of the fish 12 is accurately molded to show the natural undulations and wrinkles in the body and fins, and any such molded depressions, such as the depression at 26 under the head portion of the fish are carried on the under curved side 28. Thus, the outer edge 30 of the flange 16 is an essentially uniform curve, but the inner border of the flange is irregular at certain portions.

The mounting plaque 10 has an aperture opening 32 therethrough formed by the edge 34 and having a contour 36, corresponding to the indentation 26 of the body of the fish 12. The general shape of the aperture 32 is that of the rounded corner 38 between the wall 28 and the flange 16 of the molded fish 12. The rounded corner 38 blends or tapers to a feather edge at the edge 18.

Figure 5:
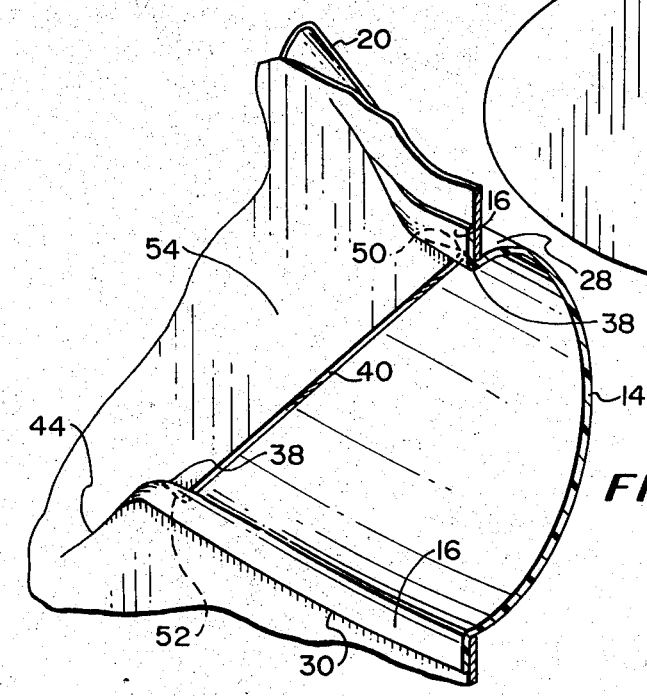
FIG. 5 is a cross-sectional view taken along the lines 5—5 of FIG. 4 to show the details of the tab interlock.

The aperture 32 in the plaque 10 has a transverse edge 40 which may be at any angle as long as the aperture 32 so defined is slightly less than the total area encompassed by the corner 38. A pair of slits 42 and 44 are formed through the plaque and join the opening 32 at the juncture of the edge 40 with the edge 34. The slits 42 angle outwardly to match the contour of the front edge 46 of the fin 20 and the front edge 48 of the fin 24. This forms a corner or tab 50 and 52 on each side, directed inwardly and adapted to be bent downward to pass under the corner or rounded edge 38 of the molded wall 28. Actually, the edge 40 and the slits 50 and 52 form a hinged flap 54 (FIG. 5) which can be readily pushed downward to engage the tabs 50 and 52.

To assemble the figure 12 with the plaque 10 it is only necessary to slide the figure nose first against the face of the plaque and gradually depress the nose end into the aperture 32 until the entire flange 16 is under and behind the edge 34. Then the flap 54 is depressed, carrying the tabs 50 and 52 under the corners 38. In assembled condition, the figure is fixed and cannot be moved back because the slits 42 and 44 engage the inner wall of the molded depression of the three-dimensional body 14.

Preferably, the aperture 32 and the flange 16 are similarly contoured so that one axis is longer than the other. The arrangement is particularly adapted for mounting figures in generally horizontal or vertical positions. It is to be understood however that this same or similar mounting can be used for a variety of molded figures and the plaque can be used in any attitude desired. The molded figure 12 can represent any three-dimensional object and a plastic bubble (not shown) can be provided over the entire assembly to add to the aesthetic value and general appearance of the display. The assembly can be adapted to be displayed as shown with the longitudinal axes of both the molded article and the plaque perpendicular to the force of gravity, a condition which would apply with the plaque 10 hanging on a wall in the attitude of FIG. 1. Conversely, the molded figure 12 could be any other object and be displayed by hanging the plaque 10 with the longest axis vertical, i.e., with the edge 40 above the opening 32.

It is apparent from the foregoing description that the gripping action of the tabs 50 and 52 can be due to the dimensions of the parts. By constructing the mounting member so that the effective diameter of the opening 32 at the edge 40 is slightly greater than or substantially equal to the outer diameter of the opening in the molded article 12 between the opposed rounded edges 38. This would cause the corners or tabs 50 and 52 formed by the flared cuts 42 and 44 to extend rigidly under the rounded edge 38. The same rigid mount is obtained or augmented by forming the width of the cuts 42 and 44 less than the wall thickness of the flange 16.

In the preferred embodiment the contour of the edge 34 is substantially the same as the contour of the outer surface 28 at the inside of the corner 38 so that a snug and conformant fit of the opening 32 around the wall 28 at the outer base of the flange 16 is obtained. The provision of natural undulations, such as 36, in the molded article, and the corresponding contour 36 on the edge 34 at the base of the flange 16 cooperates with the tab 54 to hold the assembly together. The molded article 12 can be formed of any plastic material and by known methods. The plaque 10 can be made of a yielding material such as cardboard, plastics, laminates or sheet metal. The outer surface of the molded article will bear colors for natural appearance and the fin members can be integral or separable as desired. The inner rounded edge of the unsupported tail portion of the molded article is held in spaced relief over the surface of the plaque giving a three-dimensional effect.

Although this invention has been described in relation to specific embodiments illustrated in the drawings, it is not to be so limited and a number of modifications become apparent to one skilled in the art that are still within the scope of the invention.

What is claimed is:
1. A display comprising:
 (a) a hollow molded article having an irregular contoured opening on the back side;
 (b) said opening having a rounded edge and a radial flange around a portion of said opening and encompassing two sides of said molded article;
 (c) a mounting for said article comprising a flat mounting member;
 (d) an opening in said mounting member, the edge of said opening conforming to the outer contour of said rounded edge, including said contours and adapted to encompass said flange; and
 (e) one end of said opening in said mounting member having a tab member thereacross, said tab member being defined by outwardly flared cuts in said mounting member and the edges of said cuts being engageable under said rounded edge at the end of said open portion of said molded member.
2. A display in accordance with claim 1 in which:
 (a) said hollow molded article is elongated in one direction and said opening therein is wider at the two sides than at the enclosed end.
3. A display in accordance with claim 1 in which:
 (a) the irregular contoured opening of said hollow molded article has one axis longer than the other; and
 (b) said opening in said mounting member has one axis longer than the other.
4. A display in accordance with claim 1 in which:
 (a) the diameter of said opening in said mounting member at said tab member is slightly greater than the outer diameter of said opening in said hollow molded article, whereby said tab is wider than said opening and the corners formed by said flared cuts extend rigidly under said rounded edge.
5. A display in accordance with claim 1 in which:
 (a) the diameter of said opening in said mounting member at said tab member is substantially equal to the outer diameter of said opening in said hollow molded article whereby said tab is wider than said opening an amount substantially equal to the thickness of the wall of said molded article and the corners formed by said flared cuts extend rigidly under said rounded edge.
6. A display in accordance with claim 1 in which:
 (a) said outwardly flared cuts forming said tab member have their inner ends coinciding with the contour of said opening in said molded article whereby the corners so formed engages under the rounded edge of the opening in said molded article.
7. A display in accordance with claim 1 in which:
 (a) the width of the flared cuts is less than the wall thickness of said flange of said molded article.

References Cited
UNITED STATES PATENTS

| | | | |
|---|---|---|---|
| 1,147,689 | 7/1915 | Stranders | 40—124.1X |
| 1,276,735 | 8/1918 | Devney | 40—124.1X |
| 1,839,806 | 1/1932 | Schwartz | 40—126A |
| 2,414,559 | 1/1947 | Rochlus | 40—126A |
| 2,777,231 | 1/1957 | Bollin | 40—126A |

EUGENE R. CAPOZIO, Primary Examiner

W. J. CONTRERAS, Assistant Examiner

U.S. Cl. X.R.

40—126